Aug. 6, 1935.                H. BERNARD                2,010,656
DEVICE FOR PREVENTING INTERIOR WINDSHIELD GLARE IN VEHICLES

Filed April 26, 1934

INVENTOR:
Harry Bernard,
BY
Redding, Greeley, O'Shea and Campbell
HIS ATTORNEYS

Patented Aug. 6, 1935

2,010,656

UNITED STATES PATENT OFFICE 2,010,656

DEVICE FOR PREVENTING INTERIOR WINDSHIELD GLARE IN VEHICLES

Harry Bernard, Allentown, Pa., assignor to International Motor Company, New York, N. Y., a corporation of Delaware Application April 26, 1934, Serial No. 722,437

3 Claims. (Cl. 296—97)

One of the major problems of safe night operation of vehicles is to protect the driver or operator from the interior glare arising from the greater light intensity found within the vehicle. The problem is particularly acute in the night operation of busses, the interior of which are well illuminated for the convenience of the passengers with the result that all reflecting surfaces contribute to glare. This is particularly true of the windshield which reflects the interior light because of the differential light intensity on the inside and the outside of the bus. This reflection on the windshield creates a dangerous driving condition as is well known. Expedients have been tried to relieve the driver to a degree as, for instance, by actually reducing the illumination within the bus, despite the resulting inconvenience to passengers, and by placing an opaque shield or curtain behind the driver in an effort to intercept some of the rays which would otherwise fall on the windshield and be reflected. Neither of these expedients is effective. Diminution of the lighting does not wholly eliminate glare because all of the reflecting surfaces within the body contribute to it and the shield or curtain behind the driver is necessarily of limited extent and does not shield the windshield from all of the rays.

It is the principal object of the present invention to provide a device which shall be simple, inexpensive and effective to prevent reflection of light rays from a windshield while leaving the driver's vision relatively unimpaired throughout the extent of the windshield, as is desirable. More particularly, the object of the invention is to provide a device which may be mounted adjacent the interior of the windshield and which shall be of such form and size as may be necessary to prevent the reflection of rays of light on that portion of the windshield as may be light struck from the interior. Still another object of the invention is to provide in a device for the purpose indicated openings through which the driver may see freely with comparatively little interference. A further object of the invention is to provide in combination with the improved device a shield located at the rear of the driver, the shield being so disposed as to prevent light rays from falling on that portion of the windshield which is directly in front of the driver while the improved device is of such size and so disposed as to supplement the action of the said shield and prevent the reflection of such rays of light as may fall on the remaining portion of the windshield.

The invention will be described more particularly with reference to the embodiment shown in the accompanying drawing, wherein.

Figure 1:
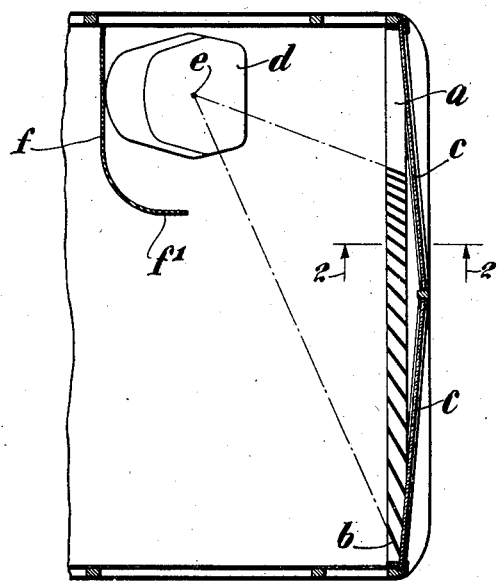
Figure 1 is a view in horizontal section and somewhat schematic, taken through a bus body and illustrating the relation of the improved device and the opaque shield to the driver and the windshield, whereby glare is effectively prevented.
Figure 2:
Figure 2 is a fragmentary view in vertical section through the windshield and the improved device for preventing glare illustrated in Figure 1, the section being taken on the plane indicated by the line 2—2 of Figure 1 and looking in the direction of the arrows.
Figure 4:
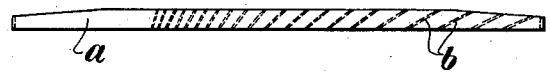
Figure 4 is a view in plan of the unit shown in Figure 3.
Figure 3:
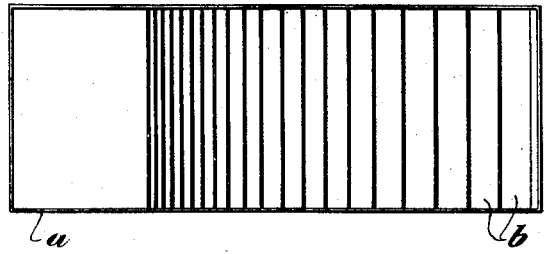
Figure 3 is a view in elevation of the improved device as seen from the interior of the vehicle.

While it will be evident as the description proceeds that the improved device may be built into the vehicle structure so that the parts thereof occupy the necessary relationship permanently to the windshield, it is preferred for the purposes of this specification to illustrate and describe a unitary construction which may be mounted removably in proper relation to the windshield, it being contemplated, for instance, that the device will be removed during daytime operation and installed at night. As shown in Figure 3 the construction comprises a frame $a$ which will ordinarily be rectangular in outline to conform to the shape and size of the windshield with which the unit is to be used and a plurality of vertically disposed opaque slats $b$ extending between the top and bottom members of the frame $a$. The entire frame $a$ as shown particularly in Figures 1 and 2 may be secured in place removably in proximity to the windshield $c$. The driver's seat is indicated at $d$ and his eyes may be assumed to be located at the point $e$. Immediately to the rear of the driver may be mounted an opaque curtain or shield $f$ which may extend forwardly at his side for a short distance as indicated at $f'$. The area of this shield is necessarily limited by the use made of the space within the bus body alongside of the driver and by the necessity for maintaining clear vision for him for such space. The effect of such a shield $f$ is to intercept light rays from the interior of the body and prevent them from falling on a small portion of the windshield directly in front of the driver. In conjunction with such a shield the purpose of the improved device is to protect the remaining portion of the windshield from glare. Accordingly, the opaque slats $b$ are disposed within the frame $a$ only to such extent as may be necessary to protect that portion of the windshield which is not protected by the curtain f. The slats b are angularly disposed and, individually, are disposed on a radius extending from the driver's eyes e. This construction, of course, results in the slats being disposed in non-parallelism, that is to say, at varying angles with respect to the frame a. However, the slats are of such width and are so disposed with relation to one another that they overlap to a degree sufficient to prevent the reflection of light rays from the windshield. It will be understood that the spacing of the slats will depend on their width. In practice, it is preferred, within reasonable limits, to make the slats of less width and hence more numerous thus reducing the depth of the frame a. That portion of the frame which does not contain slats permits clear vision of the driver through the windshield since it is assumed that such portion of the windshield is protected from light rays and interior glare by the curtain f. It will be apparent that by disposing the slats b radially with respect to the driver's eyes his vision is unimpaired except for the actual thickness of the slats. Since the thickness of the slats is unappreciable as compared to the space between adjacent slats it may be said that his vision through the portion of the windshield covered by the device is practically clear. This, of course, is a necessary condition to be satisfied in practice since it would not be permissible to prevent the driver from scanning the area visible through the portion of the windshield protected by the improved device.

In fulfilling the practical requirements of operation to the greatest extent possible the shield f and the improved device are to be treated as a combination of elements contributing to a single result, namely, the prevention of windshield glare in the interest of the driver. Accordingly, while the two elements are physically separated they are functionally interrelated since their conjoint action is to eliminate glare from the entire surface of the windshield.

Changes in structural details and in dimensions of parts may obviously be made without departing from the principle of the invention set forth herein.

I claim as my invention:

1. In a vehicle body in combination with a windshield, a device for preventing interior glare thereon comprising a plurality of vertical non-reflecting slats disposed in juxtaposition to the inner surface of the windshield and to one side of the normal straight ahead vision of the driver, each of said slats being mounted on a radius of vision of the driver and in overlapping spaced relationship to one another to leave openings therebetween, respectively, to intercept interior light rays.

2. In a vehicle in combination with a windshield, an opaque curtain disposed to the rear of the driver to intercept light rays falling on a portion of the windshield in front of the driver, and a device to prevent glare on the remaining portion of the windshield comprising a plurality of non-reflecting members mounted in juxtaposition to the interior of the windshield and disposed in spaced relationship to leave openings therebetween and so disposed with respect to one another as to intercept interior light rays.

3. In a vehicle in combination with a windshield, an opaque curtain disposed to the rear of the driver to intercept light rays falling on a portion of the windshield in front of the driver, and a device to prevent glare on the remaining portion of the windshield comprising a plurality of vertical non-reflecting slats disposed in juxtaposition to the inner surface of the windshield, each of said slats being mounted on a radius of vision of the driver and in spaced relationship to one another to leave openings therebetween and overlapping one another, respectively, to intercept interior light rays.

HARRY BERNARD.